(12) United States Patent
Ogale et al.

(10) Patent No.: US 11,141,927 B2
(45) Date of Patent: Oct. 12, 2021

(54) HYBRID BRAIDED COMPOSITE PARTS

(71) Applicant: The Boeing Company, Chicago, IL (US)

(72) Inventors: Amol Ogale, Munich (DE); Karl R Bernetich, Wilmington, DE (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/458,582

(22) Filed: Jul. 1, 2019

(65) Prior Publication Data

US 2021/0001564 A1 Jan. 7, 2021

(51) Int. Cl.
*B29C 65/36* (2006.01)
*D04C 1/06* (2006.01)
*D04C 3/48* (2006.01)
*D04C 1/02* (2006.01)
*B29C 65/00* (2006.01)

(52) U.S. Cl.
CPC ...... *B29C 65/3636* (2013.01); *B29C 65/3656* (2013.01); *B29C 66/73752* (2013.01); *D04C 1/02* (2013.01); *D04C 1/06* (2013.01); *D04C 3/48* (2013.01); *B29C 66/434* (2013.01)

(58) Field of Classification Search
CPC . B29C 65/36; B29C 65/3604; B29C 65/3636; B29C 65/364; B29C 65/3656; B29C 65/3684; B29C 66/1122; B29C 66/434; B29C 66/5221; B29C 66/612; B29C 66/65; B29C 66/652; B29C 66/721; B29C 66/7212; B29C 66/72141; B29C 66/73752; B29C 66/73921; B29C 70/22; B29C 70/222; B29C 66/52272; B29C 66/71; B29C 70/42; B29C 70/882; B29D 23/003; B29L 2023/22; B29L 2031/24; B29L 2031/3076; D04C 1/02; D04C 1/04; D04C 1/06; D04C 3/48; F16L 47/02; B29K 2071/00; B29K 2307/04; B29K 2309/08; B64D 37/32; B64D 39/04; B64D 45/02; D10B 2401/16; D10B 2505/02
See application file for complete search history.

(56) References Cited

U.S. PATENT DOCUMENTS 4,199,637 A 4/1980 Sado
4,228,207 A 10/1980 Porte et al.
5,419,231 A 5/1995 Earle, III et al.
(Continued)

FOREIGN PATENT DOCUMENTS

WO 03001566 A2 1/2003
WO 2015117148 A1 8/2015

OTHER PUBLICATIONS

Automated Fiber Placement; Wikipedia; Apr. 26, 2019.
(Continued)

*Primary Examiner* — Michael A Tolin
(74) *Attorney, Agent, or Firm* — Duft & Bornsen, PC (57) ABSTRACT

Systems and methods are provided for fabricating a hybrid composite part. A method includes braiding a first set of fibers to form a weave having a closed cross-sectional shape, braiding a second set of fibers into the weave that are chemically distinct from the first set of fibers, impregnating the weave with a resin, and hardening the resin within the weave to form a hybrid composite part.

20 Claims, 12 Drawing Sheets

(56) References Cited

U.S. PATENT DOCUMENTS

| | | | |
|---|---|---|---|
| 5,483,043 A * | 1/1996 | Sturman, Jr. | ........... B29C 35/08 |
| | | | 219/634 |
| 5,952,067 A | 9/1999 | Head | |
| 6,439,096 B1 | 8/2002 | Mungalov et al. | |
| 2008/0262472 A1 | 10/2008 | Lunn et al. | |
| 2014/0356053 A1 * | 12/2014 | Urayama | ............. B29C 65/564 |
| | | | 403/270 |

OTHER PUBLICATIONS

Braided Composited; https://www.highlandcomposites.com/innovation/braided-composites; Apr. 26, 2019.
Filament Winding; Wikipedia; Apr. 29, 2019.
QISO Braided Triaxial Fabric; A & P Technology; www.braider.com/Products/QUISO-Braided-Triaxial-Fabric.aspx; Apr. 29, 2019.
European Search Report; Application EP20181247; dated Jan. 20, 2021.

* cited by examiner

HYBRID BRAIDED COMPOSITE PARTS

FIELD

The disclosure relates to the field of fabrication, and in particular, to fabrication of composite parts.

BACKGROUND

Fiber-reinforced composite parts may be utilized for a variety of purposes. For example, a filament-wound fiberglass part may form a fuel-feed tube for transporting fuel between compartments of an aircraft or even in some embodiments between entirely different aircraft. Fiberglass tubes are painted with a conductive paint or covered with a copper mesh in order to dissipate static charges and enhance safety. However, this requires adhering the copper mesh to the tube. Furthermore, filament winding exhibits limitations in terms of the number and type of interlacements that are made between fibers. This limits the versatility of composite parts fabricated via such techniques.

Therefore, it would be desirable to have a method and apparatus that take into account at least some of the issues discussed above, as well as other possible issues.

SUMMARY

Embodiments described herein provide for braided composite parts that include both fiberglass and carbon fibers. The carbon fibers, because they are conductive, are capable of dissipating static charges. Furthermore, because the carbon fibers and the fiberglass are structurally similar, they may be woven together "dry" and impregnated with the same resin (e.g., a thermoset or thermoplastic resin) for hardening. This eliminates the need to separately affix and adhere static dissipation elements to the resulting tubular composite part, while also enhancing strength and maintaining desired rates of production.

One embodiment is a method for induction welding a composite part. The method includes acquiring a first composite part that includes fibers impregnated with a thermoplastic, acquiring a second composite part that includes braided electrically conductive fibers and braided electrically insulating fibers impregnated with the thermoplastic, placing the first composite part in contact with the second composite part at a location occupied by the electrically conductive fibers, and induction welding the first composite part to the second composite part at the location.

A further embodiment is a non-transitory computer readable medium embodying programmed instructions which, when executed by a processor, are operable for performing a method for induction welding a hybrid composite part. The method includes acquiring a first composite part that includes fibers impregnated with a thermoplastic, acquiring a second composite part that includes braided electrically conductive fibers and braided electrically insulating fibers impregnated with the thermoplastic, placing the first composite part in contact with the second composite part at a location occupied by the electrically conductive fibers, and induction welding the first composite part to the second composite part at the location.

A further embodiment is a system for forming an induction weld between composite part. The system includes a first composite part that includes fibers impregnated with a thermoplastic, a second composite part that includes braided electrically conductive fibers and braided electrically insulating fibers impregnated with the thermoplastic, and that is held in contact with the first composite part at a location occupied by the electrically conductive fibers, and an induction coil that orbits the composite parts while generating a magnetic field.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part (e.g., for use in an aircraft). Fiber that has been impregnated with an uncured thermoset resin or a thermoplastic resin is referred to as "prepreg." Other types of fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
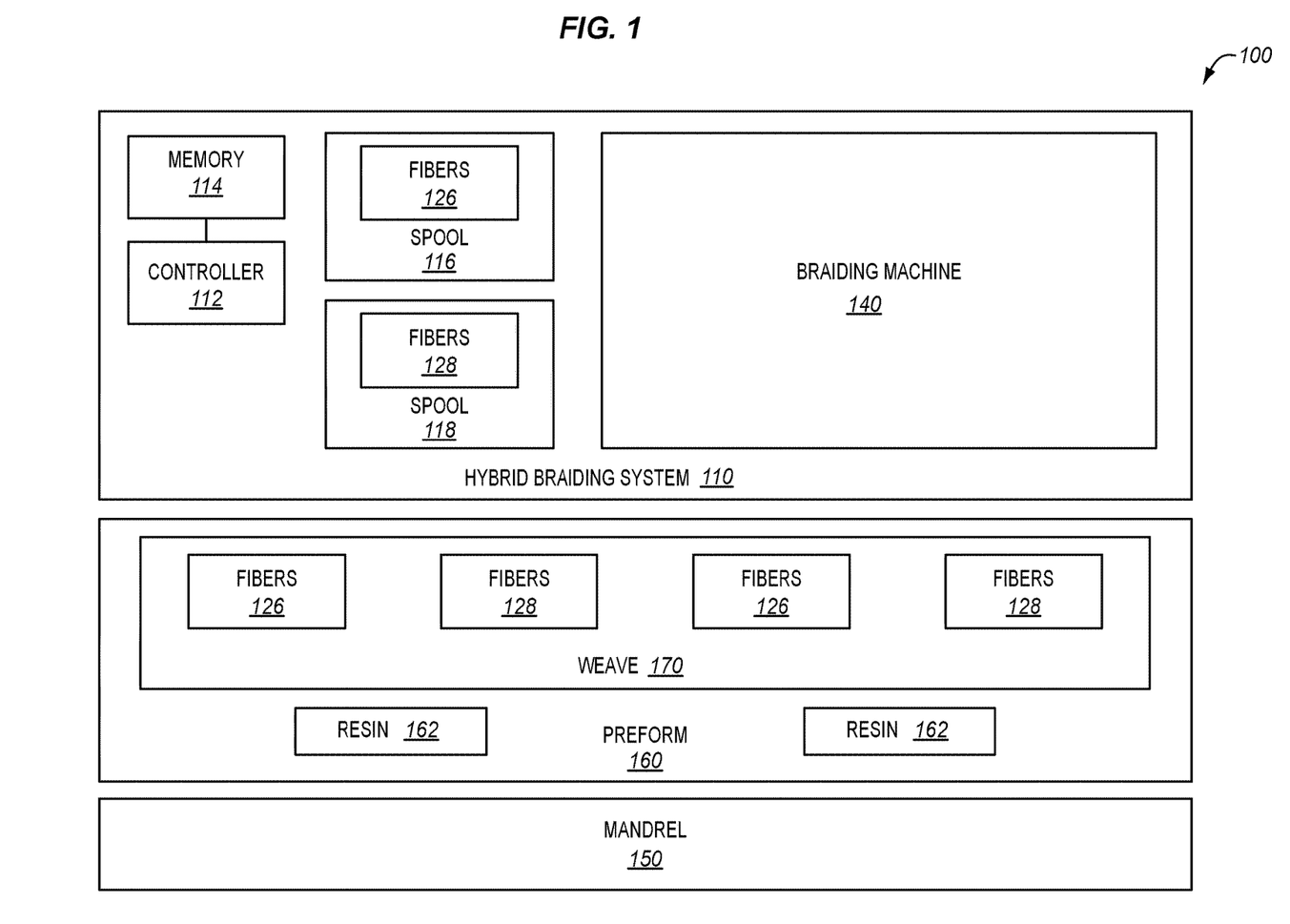
FIG. 1 is a block diagram of a fabrication environment that includes a hybrid braiding system in an illustrative embodiment.

FIG. 1 is a block diagram of a fabrication environment 100 that includes a hybrid braiding system 110 in an illustrative embodiment. Hybrid braiding system 110 comprises any system, component, or device that is operable to perform three-dimensional braiding of different types of fibers that are chemically distinct in order to form a preform for a hybrid composite part. In one embodiment, hybrid braiding system 110 braids carbon fibers and glass fibers together into the same weave of the preform.

According to FIG. 1, the hybrid braiding system 110 includes controller 112, which provides instructions to components of hybrid braiding system 110 in accordance with a Numerical Control (NC) program stored in memory 114. For example, controller 112 may operate the braiding machine 140 in accordance with the NC program. Controller 112 may be implemented, for example, as custom circuitry, as a hardware processor executing programmed instructions, or some combination thereof.

Hybrid braiding system 110 further comprises spool 116, which supplies fibers 126 of a first type, and spool 118, which supplies fibers 128 of a second type. Fibers 128 are chemically distinct from fibers 126 (e.g., they exhibit a different chemical structure than fibers 126). Braiding machine 140 combines the fibers 126 and the fibers 128 into a weave in accordance with instructions from controller 112. In one embodiment, braiding machine 140 comprises an industrial braiding machine that fabricates preforms for tubular composite parts.

FIG. 1 further comprises preform 160, which includes a weave 170 of interwoven, including the fibers 126 and the fibers 128. The weave has a circumference that forms a closed cross-sectional shape. Weave 170 of the preform 160 is braided onto a mandrel 150, and may surround the mandrel 150, resulting in the preform 160 having a tubular shape and further resulting in the mandrel 150 being disposed inside of the weave 170. In some embodiments, the preform 160 comprises pre-preg that has already been impregnated with a resin 162. In such embodiments, the resin 162 is already integrated into the fibers 126 and the fibers 128 as-stored on the spool 116 and the spool 118, for example in the form of a pre-preg tape.

Illustrative details of the operation of hybrid braiding system 110 will be discussed with regard to FIG. 2. Assume, for this embodiment, that fibers 126 and fibers 128 have been loaded onto spools that reside at the braiding machine 140, and that controller 112 has been loaded with an NC program for fabricating a specific type of woven preform for a hybrid composite part.

Figure 2:
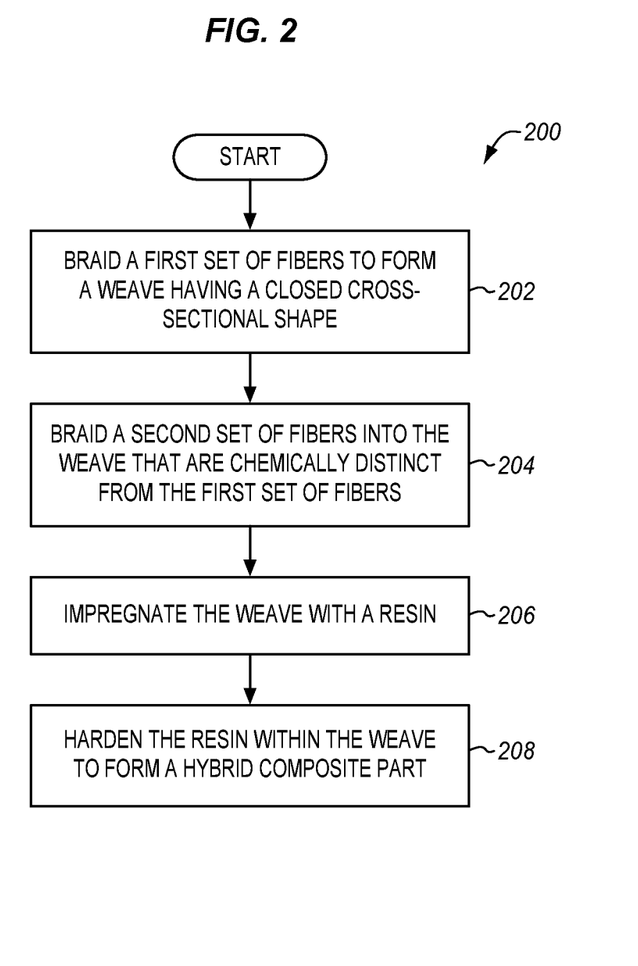
FIG. 2 is a flowchart illustrating a method for fabricating a hybrid braided composite part in an illustrative embodiment.

FIG. 2 is a flowchart illustrating a method 200 for fabricating a hybrid braided composite part in an illustrative embodiment. The steps of method 200 are described with reference to fabrication environment 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 instructs the braiding machine 140 as the braiding machine 140 braids a first set of fibers 126 (e.g., glass fibers that are electrically insulating) to form a weave 170 having a closed cross-sectional shape. In one embodiment, this comprises applying the fibers 126 in varying patterns along a circumference of the mandrel 150, such that the fibers 126 form a weave. The weave may comprise an open weave, may comprise a biaxial or triaxial braid, or may comprise other shapes or patterns exhibiting any desired fiber angles or combinations thereof.

In step 204, controller 112 instructs the braiding machine 140 as the braiding machine braids a second set of fibers 128 (e.g., carbon fibers that are electrically conductive) to into the weave 170. This includes interweaving the fibers 128 into the weave created in step 202. In one embodiment, the second set of fibers 128 are interwoven into an outer portion of the weave (e.g., an outer surface of the preform 160), while in another embodiment, the second set of fibers 128 are interwoven into an inner portion of the weave (e.g., to form an inner surface of the preform 160 proximate to the mandrel 150). In a still further embodiment, braiding the second set of fibers forms the second set of fibers into an open pattern.

As mentioned above, the second set of fibers 128 are chemically distinct from the fibers 126 in the first set. This enables the fibers 128 to perform different roles than fibers 126, such as substituting for the functionality of an adhered copper mesh, by conducting electricity (e.g., instead of insulating), or by adjusting structural properties of the weave 170. In one embodiment, this comprises applying the fibers 128 in varying patterns integrated into the weave 170, such that the fibers 128 are interwoven with the fibers 126. While fibers 128 are chemically distinct from the fibers 126, this does not preclude the fibers 128 and the fibers 126 from being the same size (e.g., the same diameter or length). Embodiments where the fibers are the same size provide a benefit by making the braiding process easier and ensuring that the resulting preform is physically uniform.

Steps 202-204 may be repeated in any desired order until a preform 160 of sufficient complexity has been fabricated. In one embodiment, the amount and type of repetition of steps 202-204 is determined by selecting a volume ratio of fibers in the first set to fibers in the second set, based on a desired/predefined level of thermal and electrical conductivity in the hybrid composite part. As used herein, a volume ratio of fibers is a ratio of volume occupied by one set of fibers to a volume occupied by another set of fibers.

In further embodiments, additional sets of fibers that are chemically distinct from other sets of fibers are also integrated into the weave 170 as part of the braiding process. For example, a Faraday cage (e.g., an arrangement of fibers that excludes electrostatic and electromagnetic influences) may be formed by braiding a third set of fibers that are electrically conductive into the weave, in an embodiment wherein the first set of fibers is electrically insulating, and is sandwiched between second and third sets of fibers that are electrically conductive. The preform 160 may then be removed from the braiding machine 140, and/or the mandrel 150 as desired. In still further embodiments, separate weaves are created of electrically conductive and electrically insulating fibers, and these weaves are slid atop each other like sleeves.

In step 206, the weave 170 is impregnated with a resin 162, such as a thermoplastic or a thermoset resin. In embodiments where the resin is a thermoset, the resin is applied at ambient temperature. In contrast, in embodiments where the resin is a thermoplastic, the resin is applied at or near its melting temperature. In embodiments wherein the fibers are integrated into a pre-preg tape, step 206 is performed as a part of steps 202-204. In embodiments where the preform 160 is braided as a dry preform, the preform 160 is moved to a separate chamber and impregnated with resin. In some embodiments, the preform 160 is additionally consolidated in order to enforce a desired shape onto the preform 160.

In step 208, the resin 162 is hardened within the weave 170 to form a hybrid composite part. For thermoplastic resins, this comprises cooling the thermoplastic below its melting temperature. For thermoset resins, this comprises heating the thermoset to a curing temperature.

Method 200 provides a technical benefit over prior techniques for braided preform fabrication, because it enables the rapid fabrication of hybrid braided preforms that have varied unique structural and electrical properties resulting from a combination of fibers having different chemical compositions. Furthermore, because the different types of fibers are added/integrated as a part of the braiding process, and not as part of an additional process, the fabrication of hybrid braided preforms does not delay the fabrication process, but rather enables the fabrication process to continue at currently-implemented speeds. That is, there is no need to perform an additional step of adhering a copper mesh.

Figure 3:
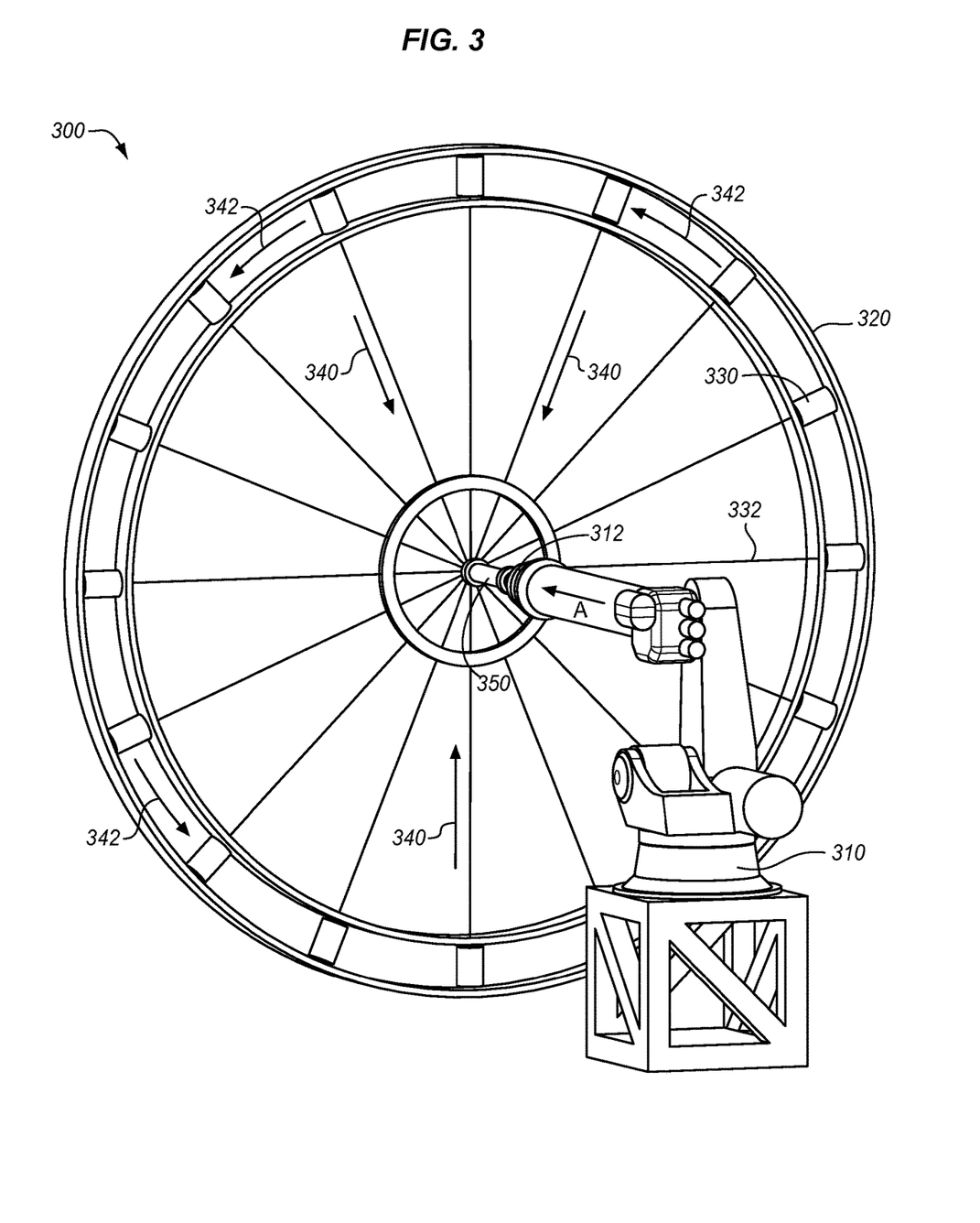
FIG. 3 is a perspective view of a braiding machine fabricating a preform in an illustrative embodiment.

FIG. 3 is a perspective view of a robot 310 (e.g., a braiding robot) fabricating a preform in an illustrative embodiment. In this embodiment, robot 310 comprises part of an industrial braiding layup system 300. Within the industrial braiding layup system 300, multiple bobbins 330 having lanes 332 of fiber tape are arranged in a circumferential pattern (e.g., along frame 320). Different lanes of fiber tape comprise fibers having different chemical compositions, and the lanes 332 of fiber tape may be implemented as pre-preg or dry fiber tape. An end effector 312 of the robot 310 controls axial displacement in direction A, and bobbins 330 move dynamically along frame 320 in direction 342, and also in controlled planetary orbits about the preform 350 and with respect to each other, to dispose the lanes 332 onto the preform 350 in a manner that results in a weave. Movement of the lanes in direction 340 results in braiding along the exterior of a cylindrical mandrel (not shown, but beneath the preform 350).

Figure 4:
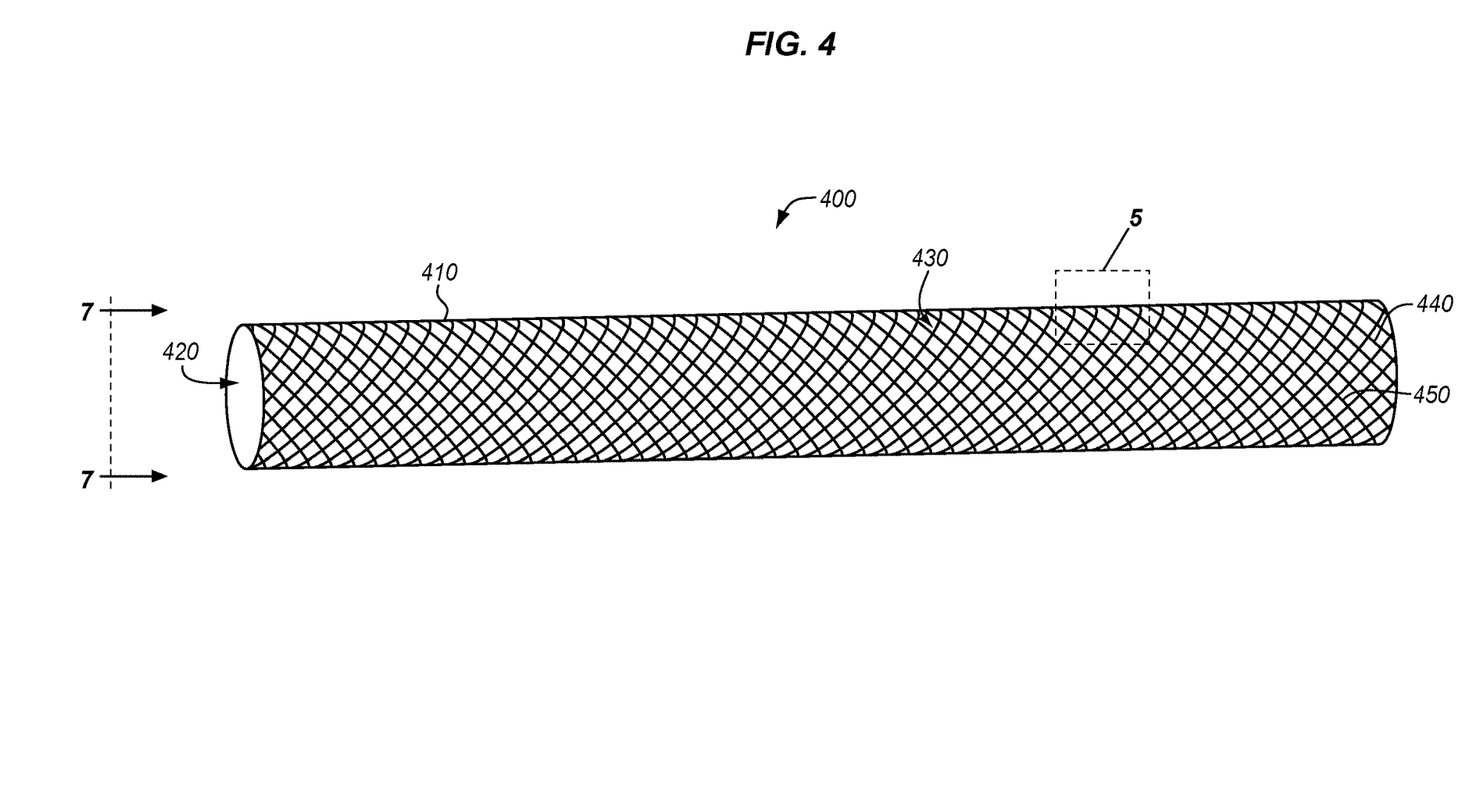
FIG. 4 is a perspective view of a hybrid braided composite part in an illustrative embodiment.

FIG. 4 is a perspective view of a hybrid braided composite part 400 in an illustrative embodiment. In FIG. 4, the hybrid braided composite part 400 includes a weave 410 within a matrix 430 of hardened resin. The weave includes a first set 440 of interwoven fibers, and a second set 450 of interwoven fibers that are chemically distinct from the first set of interwoven fibers. The weave 410 has a closed cross-sectional shape resulting in a hollow portion 420. During fabrication, a layup mandrel takes the place of the hollow portion 420. The backside of the layup mandrel is not shown in order to facilitate clarity.

Figure 5:
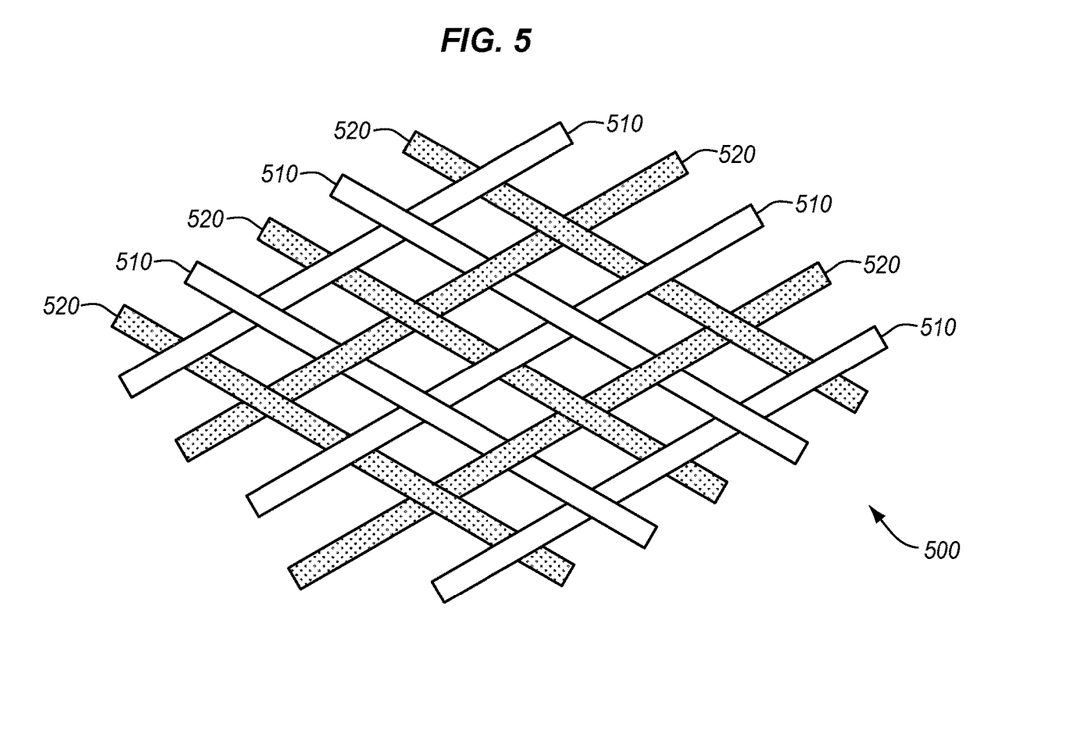
FIGS. 5-6 are zoomed-in views of a portion of a weave in a hybrid braided composite in illustrative embodiments.
Figure 6:
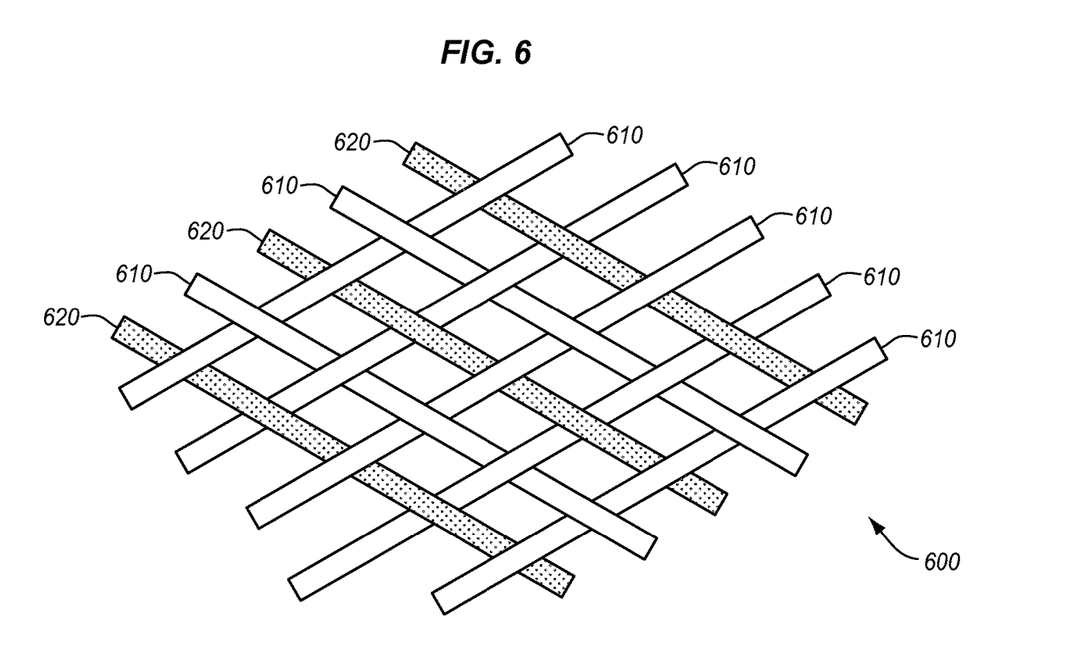

FIGS. 5-6 are zoomed-in views of a portion of a weave in a hybrid braided composite part 400 in illustrative embodiments, and correspond with section 5 of FIG. 4. These FIGS. provide examples of interwoven fibers of different types. According to FIG. 5, fibers 510 and fibers 520 within a weave 500 are chemically distinct, and the fibers proceed both leftward and rightward along a diamond shape of the weave 500. The fibers 510 and the fibers 520 alternate, resulting in the weave 500 achieving desired chemical and/or structural properties. These types of patterns may cause the fibers 520 to form a "weave within the weave," in that the fibers 520 are interwoven with the fibers 510 and also with each other. While the fibers are shown as alternating with each other, in further embodiments the fibers repeat at predetermined amounts or ratios in order to provide desired properties. In still further embodiments, certain layers, such as those forming an inner or outer surface of a preform, or those forming an interior of the preform, are made exclusively from one type of fiber, but different layers are interwoven with each other.

FIG. 6 illustrates a similar scenario to that shown in FIG. 5, except that fibers 610 within a weave 600 proceed both left and right, while fibers 620 proceed in only one direction. This results in fibers 620 forming a striped pattern, while fibers 610 form a woven pattern that is interwoven with the striped pattern. This arrangement of fibers of different chemical compositions may be particularly desirable in scenarios where the fibers 620 provide an electrical conductivity that enables static charge to be dissipated, as the fibers 620 may be spaced further apart (if desired) and need not be interwoven.

Figure 7:
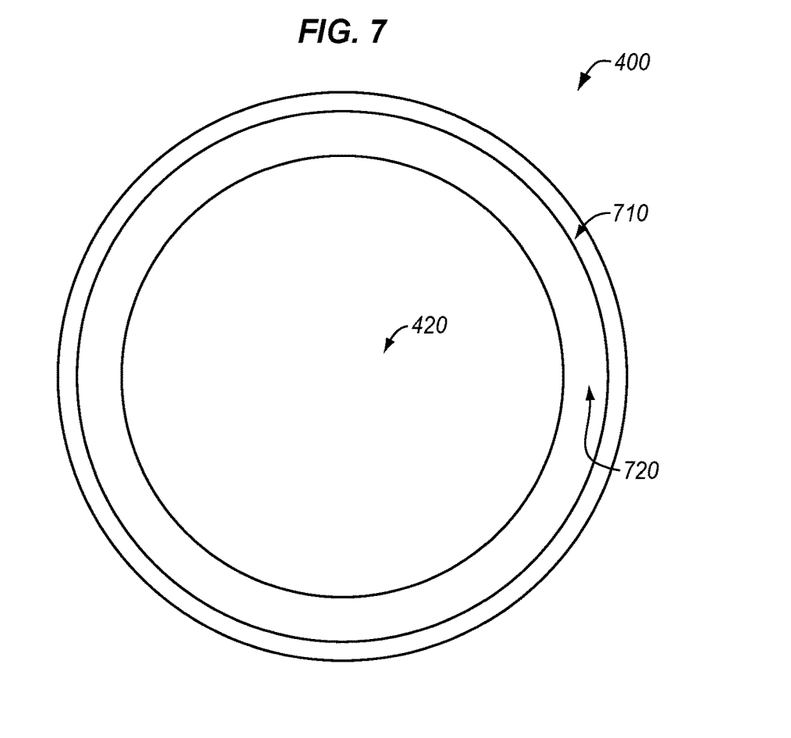
FIGS. 7-8 are front views of a hybrid braided composite part in illustrative embodiments.
Figure 8:
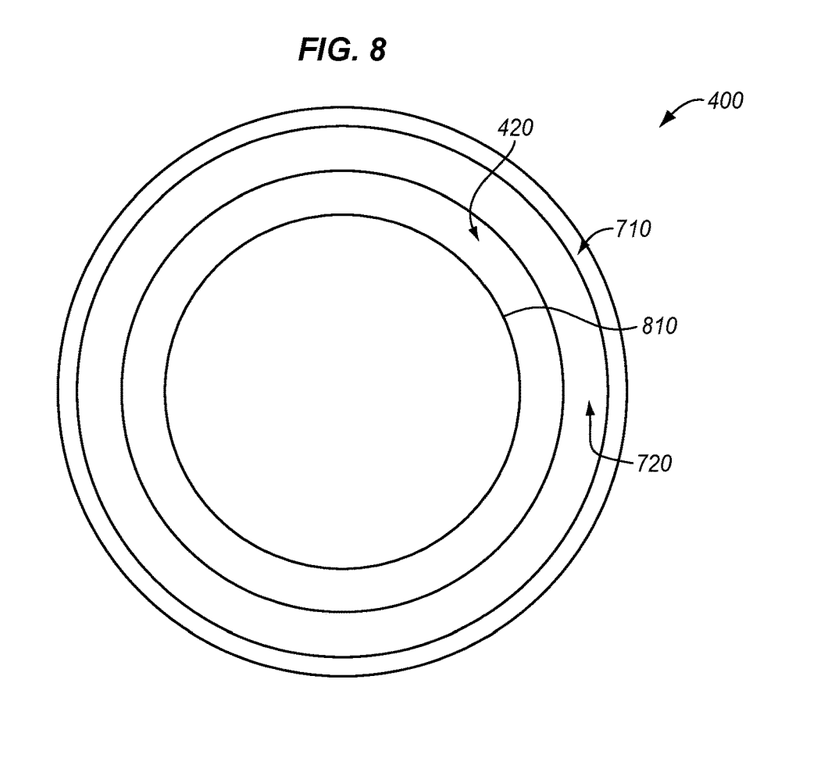

FIGS. 7-8 are front views of a hybrid braided composite part in illustrative embodiments. FIGS. 7-8 correspond with view arrows 7 of FIG. 4, and provide different versions of braids which may be implemented. In FIG. 7, the hybrid braided composite part 400 includes an outer layer 710 of fibers which are electrically conductive (in order to dissipate static charges. The conductivity of the outer layer 710 may be highly limited, in order to enable static charges to dissipate, while still protecting against a lightning strike or similar incident. For example, the outer layer 710 may be designed to have a resistance of ten Megaohms. In a further example, conductive fibers in the outer layer 710 may function as fuses that stop conducting electrical energy in response to a high amperage event.

The hybrid braided composite part 400 also includes an inner layer 720 of fibers which are electrically insulating. For example, the outer layer 710 may form a Faraday cage, and bandpass filter, or a bandstop filter for electrical energy. The layers are interwoven with each other. Furthermore, the hybrid braided composite part 400 forms a closed tubular shape which enables a fluid (e.g., fuel) to travel within it.

In FIG. 8, a wiring harness 810 is disposed within the hollow portion 420 of the hybrid braided composite part. This arrangement of conductive and optionally insulated fibers at the outer layer 710 or the inner layer 720 forms a Faraday cage that encompasses the hollow portion 420 of the part. This electrically isolates the wiring harness 810 from other sources of electrical energy that may be present within an aircraft.

Figure 9:
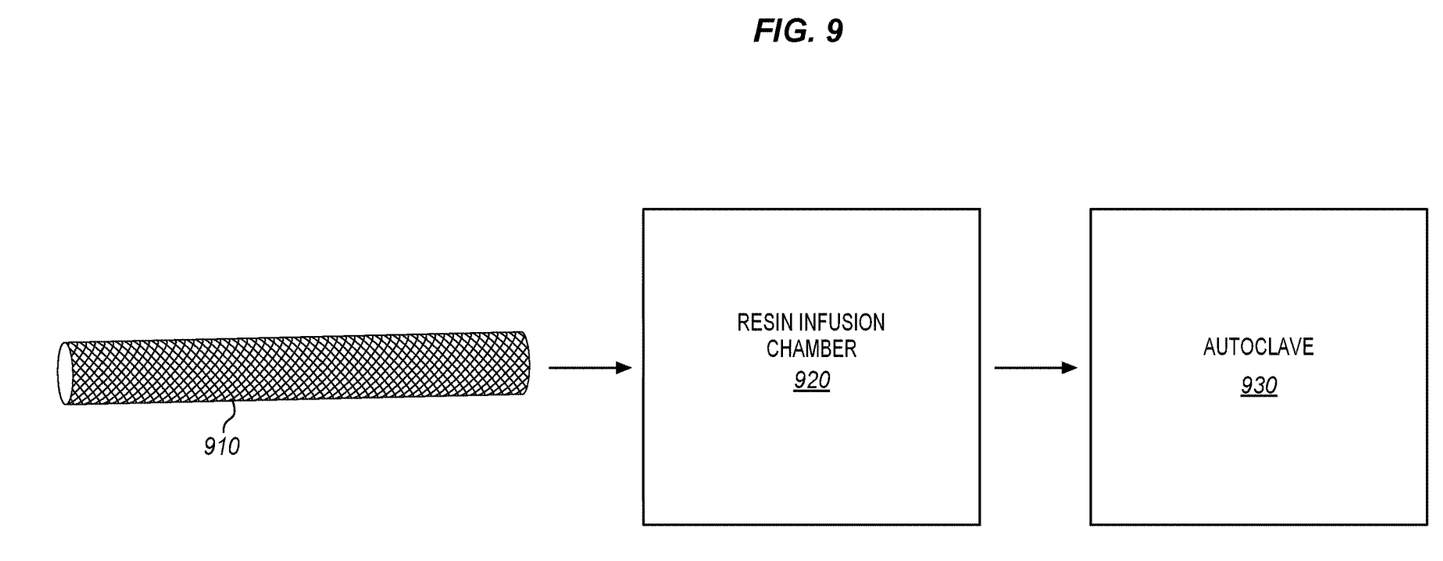
FIG. 9 is a system diagram illustrating resin infusion and autoclaving of a preform for a hybrid braided composite part in an illustrative embodiment.

FIG. 9 is a system diagram illustrating resin infusion and autoclaving of a preform 910 for a hybrid braided composite part in an illustrative embodiment. As shown in FIG. 9, after the preform 910 is removed from a braiding machine and/or mandrel, the preform 910 is placed in a resin infusion chamber 920, which applies resin via the application of pressure and/or heat into the weave of the preform. The preform 910 is then consolidated and/or cured within an autoclave 930 before hardening into a composite part.

Figure 10:
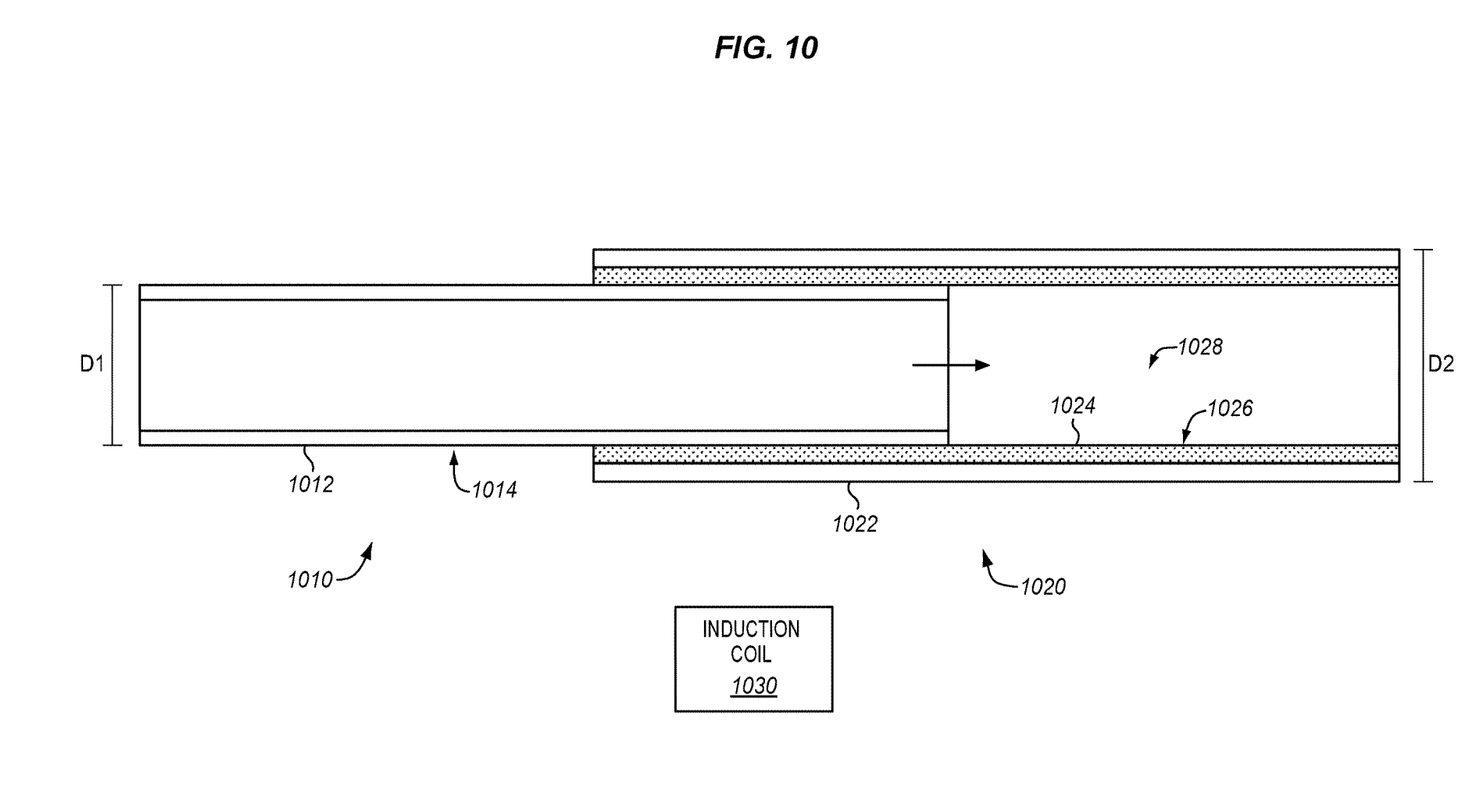
FIGS. 10-11 are section cut views of hybrid braided composite parts undergoing an induction weld in illustrative embodiments.
Figure 11:
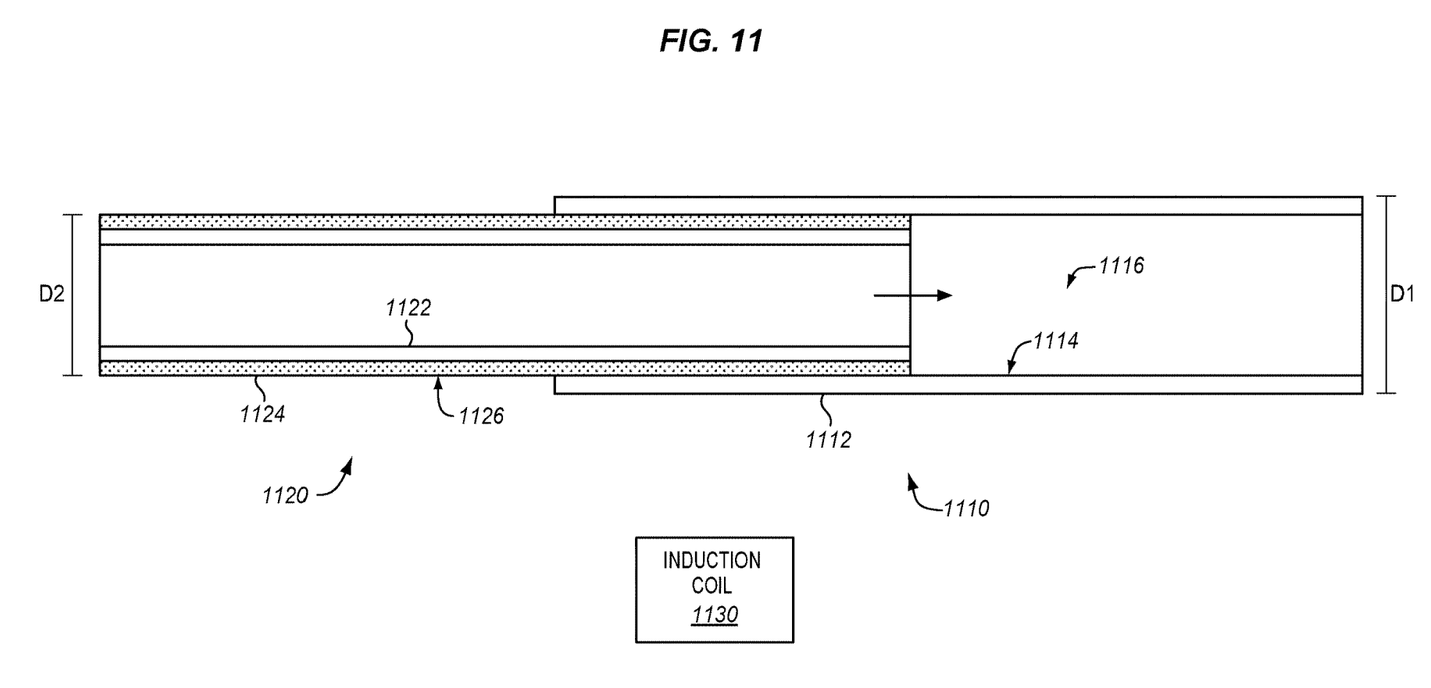

Further discussion provided herein relates to performing induction welding via any suitable combination of hybrid composite parts discussed above. FIGS. 10-11 are section cut views of hybrid braided composite parts (e.g., any of the hybrid braided composite parts discussed and/or illustrated above) undergoing an induction weld in illustrative embodiments.

In FIG. 10, a first composite part 1010 (e.g., a tube) includes a layer 1012 of fibers (e.g., insulating fibers such as glass fibers) that are impregnated with a thermoplastic (e.g., PEEK, PEKK) layer 1012 that has an outer surface/exterior 1014. First composite part 1010 has a diameter D1, which is smaller than a diameter D2 of a second composite part 1020 (e.g., another tube). Second composite part 1020 includes an outer layer 1022 made from braided fibers that are electrically insulating (e.g., fiberglass), and further includes an inner layer 1024 made from braided fibers that are electrically conductive (e.g., carbon fiber) (or a combination of insulating and conductive fibers). Inner layer 1024 includes an interior surface 1026 that defines a hollow portion 1028 of the second composite part 1020, into which first composite part 1010 is nested. An induction coil 1030 orbits around the second composite part 1020 while generating a magnetic field. This causes the electrically conductive fibers to act as susceptors and generate heat, which in turn heats the thermoplastic above its melting temperature. The melted thermoplastic in the two composite parts commingles, and after being cooled, the two composite parts form one integral part.

In FIG. 11, a first composite part 1110 (e.g., a tube) includes a layer 1112 of fibers (e.g., insulating fibers such as glass fibers) that are impregnated with a thermoplastic (e.g., PEEK, PEKK). First composite part 1110 has a diameter D1, which is greater than a diameter D2 of a second composite part 1120 (e.g., another tube). Layer 1112 includes an inner surface 1114 that defines a hollow portion 1116 of the first composite part 1110, into which second composite part 1120 is nested. Second composite part 1120 includes an inner layer 1122 made from braided fibers that are electrically insulating, and further includes an outer layer 1124 made from braided fibers that are electrically conductive (or a combination of insulating and conductive fibers). Outer layer 1124 defines an outer surface/exterior 1126 of the second composite part 1120. An induction coil 1130 orbits around the second composite part 1120 while generating a magnetic field. In a further embodiment, the composite parts are rotated about their centers, and hence move their surfaces along a circular arc relative to an induction coil and facilitate induction welding. This causes the electrically conductive fibers to act as susceptors and generate heat, which in turn heats the thermoplastic above its melting temperature. In embodiments wherein an outer composite part provides electrical insulation, the induction coil may be moved along an interior of the composite parts. In embodiments wherein an inner composite part provides electrical insulation, the induction coil may be moved along an exterior of the composite parts. Furthermore, the temperature of locations away from the weld interface may be kept below a desired level (e.g., below a melting temperature of the thermoplastic) by design. For example, placement of glass fibers (as opposed to carbon fibers) may help to control temperatures in and around the weld interface (i.e., by reducing the amount of inductive heating that occurs in specific locations). At the weld interface (and/or in other locations), the melted thermoplastic in the two composite parts commingles, and after being cooled, the two composite parts form one integral part.

Figure 12:
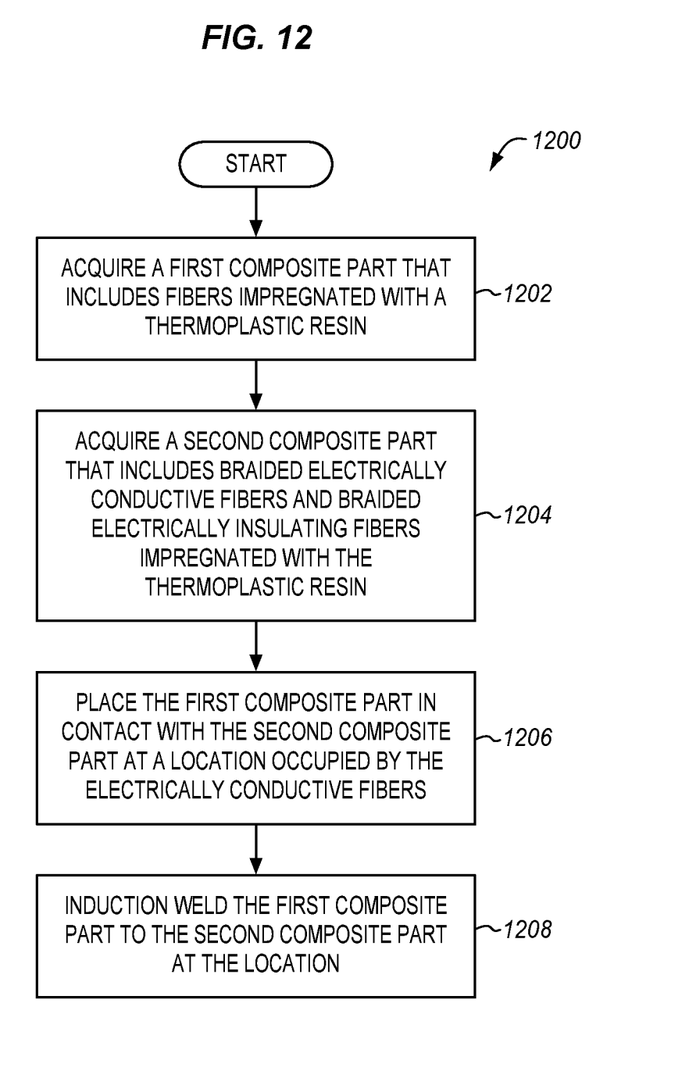
FIG. 12 is a flowchart illustrating a method for induction welding hybrid braided composite parts in an illustrative embodiment.

FIG. 12 is a flowchart illustrating a method 1200 for induction welding hybrid braided composite parts in an illustrative embodiment. Step 1202 includes acquiring a first composite part 1010 that includes fibers impregnated with a thermoplastic resin. This may comprise a technician or robot arm picking up and placing the first composite part 1010 at a desired position.

Step 1204 comprises acquiring a second composite part 1020 that includes braided electrically conductive fibers and braided electrically insulating fibers impregnated with the thermoplastic resin. Step 1204 may be performed in a similar manner to step 1202.

Step 1206 comprises placing the first composite part 1010 in contact with the second composite part 1020 at a location occupied by the electrically conductive fibers. That is, the composite parts are arranged such that the first composite part 1010 contacts a location on the second composite part 1020 through which the electrically conductive fibers are woven (e.g., inner layer 1024). In some embodiments, this comprises nesting one of the composite parts within the other composite part, resulting in an elongated tube. This means that a circumference of one part may contact the other part. In other words, the placement of the first composite part ensures that electrically conductive fibers are disposed at a desired weld interface (e.g., such that the composite parts form a longitudinal lap splice). In further embodiments, a circumference of one composite part contacts the other composite part.

Step 1208 comprises induction welding the first composite part to the second composite part at the location. In one embodiment, the induction welding is performed by orbiting the induction coil 1030 around the second composite part 1020. In a further embodiment, second composite part 1020 (and/or the first composite part) are rotated/spun while the induction coil 1030 remains in place. In embodiments where tubular composite parts are welded together, induction welding comprises exposing electrically conductive fibers arranged at an exterior (or inner surface that defines a hollow portion) of the second composite part to a magnetic field. This heats the electrically conductive fibers in the second composite part 1020, which melts and commingles the thermoplastic at the intersection of the composite parts. Upon cooling, the thermoplastic solidifies resulting in a single integral part. In further embodiments, performing induction welding of fibers in a first set to fibers in a second set may be performed by applying an electromagnetic field to the weave.

Figure 13:
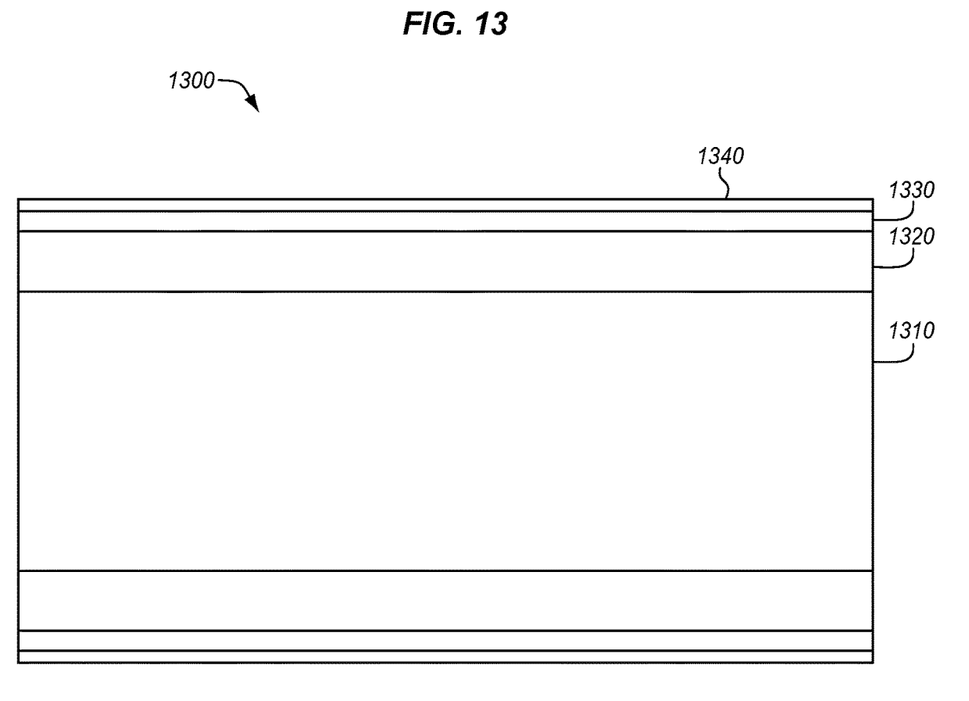
FIG. 13 is a section cut views of a further hybrid braided composite part in an illustrative embodiment.

FIG. 13 is a section cut views of a further hybrid braided composite part 1300 in an illustrative embodiment. According to FIG. 13, large number of fiberglass layers 1320 are laid-up or woven atop a mandrel 1310. Then, a smaller number of carbon fiber layers 1330 are laid-up atop the fiberglass layers 1320, and one to two additional fiberglass layers 1340 are placed atop the carbon fiber layers 1330. During induction welding, thermoplastic in the one to two additional fiberglass layers is melted due to heating of carbon fibers within the carbon fiber layers 1330.

EXAMPLES

In the following examples, additional processes, systems, and methods are described in the context of a preform for a hybrid braided composite part.

Figure 14:
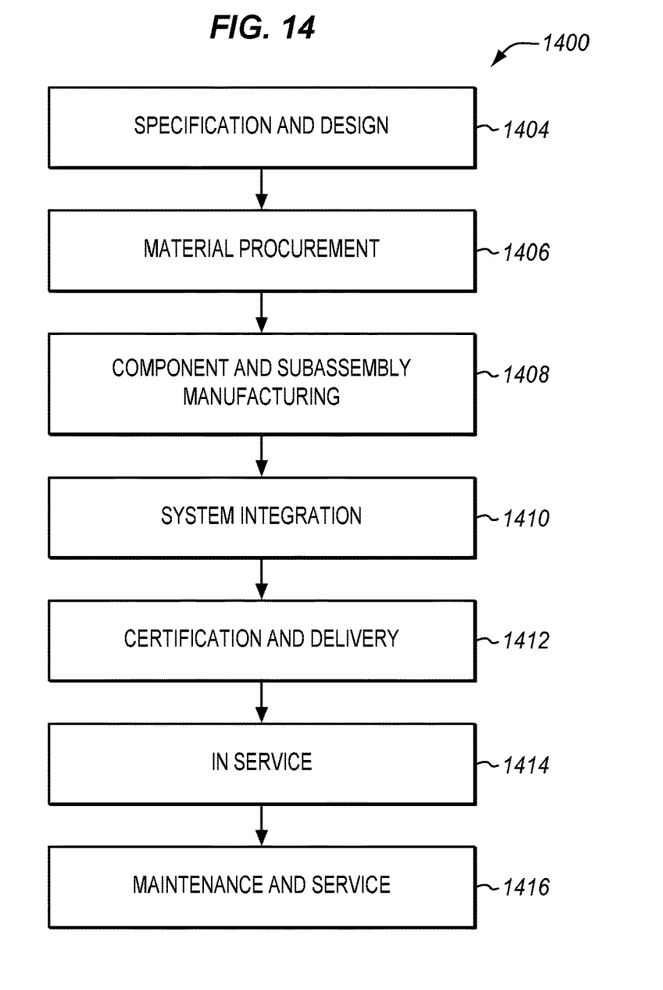
FIG. 14 is a flow diagram of aircraft production and service methodology in an illustrative embodiment.
Figure 15:
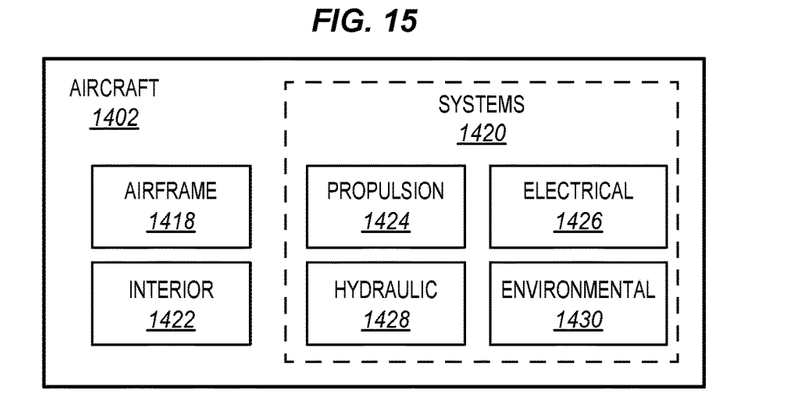
FIG. 15 is a block diagram of an aircraft in an illustrative embodiment.

Referring more particularly to the drawings, embodiments of the disclosure may be described in the context of aircraft manufacturing and service in method 1400 as shown in FIG. 14 and an aircraft 1402 as shown in FIG. 15. During pre-production, method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine work in maintenance and service 1416 (which may also include modification, reconfiguration, refurbishment, and so on). Apparatus and methods embodied herein may be employed during any one or more suitable stages of the production and service described in method 1400 (e.g., specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion system 1424, electrical system 1426, hydraulic system 1428, environmental system 1430).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 1402 produced by method 1400 may include an airframe 1418 with a plurality of systems 1420 and an interior 1422. Examples of systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1400. For example, components or subassemblies corresponding to component and subassembly manufacturing 1408 may be fabricated or manufactured in a manner similar to components or subassemblies produced while the aircraft 1402 is in service. Also, one or more apparatus embodiments, method embodiments, or a combination thereof may be utilized during the subassembly manufacturing 1408 and system integration 1410, for example, by substantially expediting assembly of or reducing the cost of an aircraft 1402. Similarly, one or more of apparatus embodiments, method embodiments, or a combination thereof may be utilized while the aircraft 1402 is in service, for example and without limitation during the maintenance and service 1416. For example, the techniques and systems described herein may be used for material procurement 1406, component and subassembly manufacturing 1408, system integration 1410, service 1414, and/or maintenance and service 1416, and/or may be used for airframe 1418 and/or interior 1422. These techniques and systems may even be utilized for systems 1420, including, for example, propulsion system 1424, electrical system 1426, hydraulic system 1428, and/or environmental system 1430.

In one embodiment, a part comprises a portion of airframe 1418, and is manufactured during component and subassembly manufacturing 1408. The part may then be assembled into an aircraft in system integration 1410, and then be utilized in service 1414 until wear renders the part unusable. Then, in maintenance and service 1416, the part may be discarded and replaced with a newly manufactured part. Inventive components and methods may be utilized throughout component and subassembly manufacturing 1408 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for induction welding a composite part, the method comprising:
    acquiring a first composite part that includes fibers impregnated with a thermoplastic;
    acquiring a second composite part that includes braided electrically conductive fibers and braided electrically insulating fibers impregnated with the thermoplastic;
    placing the first composite part in contact with the second composite part at a location occupied by the electrically conductive fibers; and
    induction welding the first composite part to the second composite part at the location.

2. The method of claim 1 wherein:
    the first composite part comprises a tube having a first diameter, and the second composite part comprises a tube having a second diameter larger than the first diameter.

3. The method of claim 2 wherein:
    the placing comprises nesting the first composite part within the second composite part, such that a circumference of the first composite part contacts the second composite part.

4. The method of claim 1 wherein:
    the first composite part comprises a tube having a first diameter, and the second composite part comprises a tube having a second diameter smaller than the first diameter.

5. The method of claim 4 wherein:
the placing comprises nesting the second composite part within the first composite part, such that a circumference of the second composite part contacts the first composite part.

6. The method of claim 1 wherein:
the induction welding is performed by orbiting an induction coil around the second composite part.

7. The method of claim 1 wherein:
the induction welding is performed by rotating the second composite part.

8. The method of claim 1 wherein:
induction welding comprises exposing electrically conductive fibers arranged at an exterior of the second composite part to a magnetic field.

9. The method of claim 1 wherein:
induction welding comprises exposing electrically conductive fibers, arranged at an inner surface of the second composite part that defines a hollow portion, to a magnetic field.

10. The method of claim 1 wherein:
the insulating fibers comprise glass fibers.

11. The method of claim 1 wherein:
the electrically conductive fibers comprise carbon fibers.

12. The method of claim 1 wherein:
the electrically conductive fibers form a portion of a Faraday cage.

13. The method of claim 1 wherein:
induction welding the first composite part to the second composite part comprises commingling thermoplastic in the first composite part with thermoplastic in the second composite part.

14. A method for fabrication comprising:
providing a first composite part that includes fibers impregnated with a thermoplastic;
providing a second composite part that includes braided electrically conductive fibers and braided electrically insulating fibers impregnated with the thermoplastic;
holding the second composite part in contact with the first composite part at a location occupied by the electrically conductive fibers;
orbiting an induction coil around the second composite part; and
generating a magnetic field at the induction coil while the induction coil is orbiting.

15. The method of claim 14 wherein:
the first composite part comprises a tube having a first diameter, the second composite part comprises a tube having a second diameter larger than the first diameter, and the first composite part is nested within the second composite part.

16. The method of claim 14 wherein:
the first composite part comprises a tube having a first diameter, the second composite part comprises a tube having a second diameter smaller than the first diameter, and the second composite part is nested within the first composite part.

17. The method of claim 14 wherein:
the first composite part and the second composite part form a longitudinal lap splice.

18. The method of claim 14 wherein:
the electrically insulating fibers comprise glass fibers.

19. The method of claim 14 wherein:
the electrically conductive fibers comprise carbon fibers.

20. The method of claim 14 wherein:
the electrically conductive fibers form a portion of a Faraday cage.

\* \* \* \* \*